United States Patent
Nakatsu et al.

(10) Patent No.: US 6,790,269 B2
(45) Date of Patent: Sep. 14, 2004

(54) INK FOR USE IN INK JET RECORDING

(75) Inventors: Hiromi Nakatsu, Amagasaki (JP); Masanori Kinomoto, Yamatokoriyama (JP); Seita Suzuki, Yamatokoriyama (JP); Takanori Kamoto, Nara (JP); Kiyofumi Morimoto, Tenri (JP); Hiroaki Nakaya, Osakasayama (JP)

(73) Assignee: Sharp Kabushiki Kaisha, Osaak (JP)

( * ) Notice: Subject to any disclaimer, the term of this patent is extended or adjusted under 35 U.S.C. 154(b) by 0 days.

(21) Appl. No.: 10/423,884

(22) Filed: Apr. 28, 2003

(65) Prior Publication Data
US 2003/0213406 A1 Nov. 20, 2003

(30) Foreign Application Priority Data
May 15, 2002 (JP) ................ 2002-140025

(51) Int. Cl.[7] .......... C09D 11/00; C09D 11/02
(52) U.S. Cl. ............. 106/31.59; 106/31.58; 106/31.86; 106/31.89
(58) Field of Search ............ 106/31.59, 31.58, 106/31.89, 31.86

(56) References Cited
FOREIGN PATENT DOCUMENTS

| JP | 2-255875 | 10/1990 |
| JP | 4-18462 | 1/1992 |

Primary Examiner—Mark L. Bell
Assistant Examiner—Veronica F. Faison
(74) Attorney, Agent, or Firm—Nixon & Vanderhye, P.C.

(57) ABSTRACT

An ink for use in the ink-jet recording comprising a dye and/or a pigment and water as the indispensable components and a water-insoluble solid content of 1% or more of the whole quantity, the ink further comprising: a nonionic surfactant having polyethylene oxide groups and polypropylene oxide groups, which is a substance having the structure shown by the following structural formula 1; and a number x of the added polyethylene oxide groups and a number y of the added polypropylene oxide groups satisfy the relation that $$0 < x \leq 10,$$

and the relation that $$x/2 - 1 < y < x/3 + 2,$$

Formula 1
$$CH_3(CH_2)_q CH(CH_2)_r CH_3$$
$$| $$
$$OEO_x PO_y H$$

where q and r are respectively the numbers of the methylene groups, and satisfy the relation that $$9 \leq q + r \leq 11.$$

9 Claims, 3 Drawing Sheets

| | EX1 | EX2 | EX3 | EX4 | EX5 | EX6 | EX7 | EX8 | EX9 | EX10 | EX11 |
|---|---|---|---|---|---|---|---|---|---|---|---|
| SELF-DISPERSION PIGMENT (BLACK) | 5 | 1.5 | 2 | 5 | 5 | 5 | 10 | 5 | | 5 | 5 |
| CARBON BLACK | | | | | | | | | 5 | | |
| BLACK DYE | | | | | | | | | | | |
| STYRENE-ACRYL BASED DISPERSING AGENT | | | | | | | | | 0.2 | | |
| GLYCERIN | 10 | 10 | 10 | 10 | 10 | 10 | 10 | 10 | 10 | 5 | 10 |
| DIETHYLENE-GLYCOL | 10 | 10 | 10 | 10 | 10 | 10 | 10 | 10 | 10 | 5 | 10 |
| NMP | 10 | 10 | 10 | 10 | 10 | 10 | 10 | 5 | 5 | 5 | 10 |
| PEG400 | 10 | 10 | 10 | 10 | 10 | 10 | 10 | 2 | 2 | 0 | 2 |
| ETHYLENE-GLYCOL BUTYL ETHER | 5 | 5 | 5 | 5 | 5 | 5 | 5 | 5 | 5 | 3 | 0 |
| STYRENE-ACRYL EMULSION | 5 | 5 | 5 | 5 | 5 | 5 | 5 | 0 | 5 | 5 | 5 |
| SURFACTANT 1 | 0.2 | 0.002 | 0.008 | 0.03 | 0.8 | 1.2 | 4.5 | 0.5 | 0.5 | 0.5 | 0.5 |
| SURFACTANT 2 | 0 | 0 | 0 | 0 | 0 | 0 | 0 | 0 | 0 | 0 | 0 |
| SURFACTANT 3 | 0 | 0 | 0 | 0 | 0 | 0 | 0 | 0 | 0 | 0 | 0 |
| SURFACTANT 4 | 0 | 0 | 0 | 0 | 0 | 0 | 0 | 0 | 0 | 0 | 0 |

FIG. 1

|  | EX1 | EX2 | EX3 | EX4 | EX5 | EX6 | EX7 | EX8 | EX9 | EX10 | EX11 |
|---|---|---|---|---|---|---|---|---|---|---|---|
| SELF-DISPERSION PIGMENT (BLACK) | 5 | 1.5 | 2 | 5 | 5 | 5 | 10 | 5 |  | 5 | 5 |
| CARBON BLACK |  |  |  |  |  |  |  |  | 5 |  |  |
| BLACK DYE |  |  |  |  |  |  |  |  |  |  |  |
| STYRENE-ACRYL BASED DISPERSING AGENT |  |  |  |  |  |  |  |  | 0.2 |  |  |
| GLYCERIN | 10 | 10 | 10 | 10 | 10 | 10 | 10 | 10 | 10 | 5 | 10 |
| DIETHYLENE-GLYCOL | 10 | 10 | 10 | 10 | 10 | 10 | 10 | 10 | 10 | 5 | 10 |
| NMP | 10 | 10 | 10 | 10 | 10 | 10 | 10 | 5 | 5 | 5 | 10 |
| PEG400 | 10 | 10 | 10 | 10 | 10 | 10 | 10 | 2 | 2 | 0 | 2 |
| ETHYLENE-GLYCOL BUTYL ETHER | 5 | 5 | 5 | 5 | 5 | 5 | 5 | 5 | 5 | 3 | 0 |
| STYRENE-ACRYL EMULSION | 5 | 5 | 5 | 5 | 5 | 5 | 5 | 0 | 5 | 5 | 5 |
| SURFACTANT 1 | 0.2 | 0.002 | 0.008 | 0.03 | 0.8 | 1.2 | 4.5 | 0.5 | 0.5 | 0.5 | 0.5 |
| SURFACTANT 2 | 0 | 0 | 0 | 0 | 0 | 0 | 0 | 0 | 0 | 0 | 0 |
| SURFACTANT 3 | 0 | 0 | 0 | 0 | 0 | 0 | 0 | 0 | 0 | 0 | 0 |
| SURFACTANT 4 | 0 | 0 | 0 | 0 | 0 | 0 | 0 | 0 | 0 | 0 | 0 |

FIG. 2

|  | COMP. EX1 | COMP. EX2 | COMP. EX3 | COMP. EX4 | COMP. EX5 | COMP. EX6 | COMP. EX7 | COMP. EX8 |
|---|---|---|---|---|---|---|---|---|
| SELF-DISPERSION PIGMENT (BLACK) | 5 | 5 | 5 | 5 | 5 | 0.5 | 25 | |
| CARBON BLACK | | | | | | | | |
| BLACK DYE | | | | | | | | 3 |
| STYRENE-ACRYL BASED DISPERSING AGENT | | | | | | | | |
| GLYCERIN | 10 | 10 | 10 | 10 | 10 | 10 | 10 | 10 |
| DIETHYLENE-GLYCOL | 10 | 10 | 10 | 10 | 10 | 10 | 10 | 10 |
| NMP | 10 | 10 | 10 | 10 | 10 | 10 | 10 | 10 |
| PEG400 | 10 | 10 | 10 | 10 | 10 | 10 | 10 | 10 |
| ETHYLENE-GLYCOL BUTYL ETHER | 5 | 5 | 5 | 5 | 5 | 5 | 5 | 5 |
| STYRENE-ACRYL EMULSION | 5 | 5 | 5 | 5 | 5 | 0 | 0 | 5 |
| SURFACTANT 1 | 0 | 0 | 0 | 0 | 6 | 0.5 | 0.5 | 0.5 |
| SURFACTANT 2 | 0 | 0.5 | 0 | 0 | 0 | 0 | 0 | 0 |
| SURFACTANT 3 | 0 | 0 | 0.5 | 0 | 0 | 0 | 0 | 0 |
| SURFACTANT 4 | 1 | 0 | 0 | 0 | 0 | 0 | 0 | 0 |

FIG. 3

| | EX1 | EX2 | EX3 | EX4 | EX5 | EX6 | EX7 | EX8 | EX9 | EX10 | EX11 |
|---|---|---|---|---|---|---|---|---|---|---|---|
| DISCHARGE STABILITY | E | G | G | G | G | G | M | E | G | G | G |
| FIXABILITY | E | E | E | E | E | E | E | M | E | E | E |
| WATER RESISTANCE | E | E | E | E | E | G | G | G | G | E | E |
| IMAGE DENSITY | E | M | G | E | G | G | G | G | G | M | M |
| OVERALL EVALUATION | E | M | G | G | G | M | M | M | G | M | M |

FIG. 4

| | COMP. EX1 | COMP. EX2 | COMP. EX3 | COMP. EX4 | COMP. EX5 | COMP. EX6 | COMP. EX7 | COMP. EX8 |
|---|---|---|---|---|---|---|---|---|
| DISCHARGE STABILITY | P | M | M | P | P | G | P | E |
| FIXABILITY | | | | | | P | | E |
| WATER RESISTANCE | | | | | | M | | M |
| IMAGE DENSITY | | | | | | M | | G |
| OVERALL EVALUATION | P | P | P | P | P | P | P | P |

INK FOR USE IN INK JET RECORDING

BACKGROUND OF THE INVENTION

The present invention relates to an ink for use in an ink-jet recording, and particularly an ink for use in an ink-jet printer in which ink droplets are discharged from a record head to obtain an ink image on a recording medium.

DESCRIPTION OF THE RELATED ART

Conventionally, dyes have been used as the inks for use in the ink-jet recording when forming a recorded image by discharging ink droplets onto a recording medium. The dyes are used to improve the discharge stability and ink preservation stability. However, it is preferable to use pigments rather than inks in view of the water resistance and weather resistance of the recorded objects.

Accordingly, Japanese Patent Laid-Open No. 2-255875 and Japanese Patent Laid-Open No. 4-18462 report an ink having water resistance and weather resistance properties and solves the problem of blurring of characters and the like which have been the controversial points of the conventional dye-based inks, wherein the ink comprises water, a pigment, and a resin emulsion. Such an ink composed of a pigment and a resin emulsion is excellent in the light resistance, water resistance, abrasion resistance, and the like of the printed image.

However, since there are contained in the ink a number of components such as emulsion, in addition to the coloring component or pigment, the bubble forming property of the ink is increased and the discharge property of the ink is degraded. Consequently, the air bubbles are generated in the ink-jet head, and the discharge energy of the ink-jet head is decreased, so that sufficient ink discharge cannot be obtained, leading to the curved flight of the ink dot, poor discharge and the like. Thus, poor images are generated.

As described above, the generation of bubbles leads to the above-mentioned adverse effects on the inkjet head. Then, inks free from generation of bubbles are desirable, but it is impossible to completely suppress the bubble generation because a plurality of materials are mixed together in producing an ink.

Japanese Patent Laid-Open No. 61-250076 discloses an attempt to overcome such problems by regulating the bubble forming property of the surfactant used in an ink. It is certainly conceivable that the bubble forming property of the surfactant in the ink somewhat affects the bubble forming property of the ink. However, the bubble forming property of the ink itself cannot be completely regulated by the bubble forming property of the surfactant. In particular, in an ink which contains, as in the present invention, a plurality of components such as a resin emulsion in addition to a coloring component of pigment, each respective component significantly affects the bubble forming property of the ink.

Furthermore, Japanese Patent Laid-Open No. 9-279068 discloses an attempt of regulating the height of the bubble at the elapsed time of 5 minutes on the basis of the JISK standard concerned. However, it is preferable in an ink-jet system that the bubble generation is suppressed as much as possible, or the bubbles once generated are instantly eliminated.

SUMMARY OF THE INVENTION

The present invention intends to solve the problems found in the prior art, and takes as its object the provision of the ink for use in the ink-jet recording which is excellent in the water resistance and lightfast properties, and is additionally stable in the discharge property.

As a result of diligent study intended to overcome the above described problems, the present inventors have come to achieve the present invention by discovering that the purposed ink can be obtained in the following manner: the ink contains at least a solvent containing water as the main component, a solid content containing a coloring material, and at least one type of nonionic surfactant; and the number x of the polyethylene oxide groups and the number y of the polypropylene oxide groups added to the nonionic surfactant are made to fall within the prescribed ranges.

More specifically, the present invention is an ink for use in the ink-jet recording which contains a dye and/or a pigment and water as the indispensable components and a water-insoluble solid content of 1% or more of the whole quantity, wherein the ink comprises:

a nonionic surfactant containing polyethylene oxide groups and polypropylene oxide groups, which is a substance having the structure shown by the following structural formula (1); and the number x of the added ethylene oxide groups and the number y of the added polypropylene oxide groups satisfy the relation that $$0 < x \leq 10,$$

and the relation that $$x/2-1 < y < x/3+2,$$

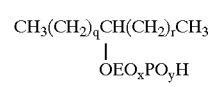

Formula 1 where q and r are respectively the numbers of the methylene groups, and satisfy the relation that $$9 \leq q+r \leq 11.$$

And the present invention is an ink for use in an ink-jet recording, wherein the content of the above described nonionic surfactant is no less than 0.001 wt % and no more than 2 wt %.

And the present invention is an ink for use in an ink-jet recording in which the solid content containing a coloring material is composed of a pigment and a water-soluble resin and/or an emulsion and/or a latex.

Thus, the performance of the printed object, particularly the water resistance and abrasion resistance, are improved.

Furthermore, the present invention is an ink for use in the ink-jet recording in which the above described pigment is a self-dispersion pigment.

Additionally, the present invention is an ink for use in the ink-jet recording, further comprising a water-soluble organic solvent in a content of 30 wt % or more.

Thus, the clogging is further prevented and the solubility of the additives is improved.

And the present invention is an ink for use in an ink-jet recording in which the above described water-soluble organic solvent contains 3 wt % or more of an ethyleneglycol based ether.

Furthermore, the present invention is an ink for use in an ink-jet recording in which the above described ethyleneglycol based ether is a triethyleneglycol based ether and/or a tetraethyleneglycol based ether.

Thus, the image density is increased and the image quality is improved.

Additionally, the present invention is an ink for use in an ink-jet recording in which the static surface tension is 25 dyne/m to 50 dyne/m.

Further, the present invention is an ink for use in an ink-jet recording in which the viscosity is 1 cp to 10 cp.

BRIEF DESCRIPTION OF THE DRAWINGS

FIG. 1 is a diagram describing the components of the inks in Examples;

FIG. 2 is a diagram describing the components of the inks in Comparative Examples;

FIG. 3 is a diagram describing the evaluation of the characteristics of the inks in Examples; and FIG. 4 is a diagram describing the evaluation of the characteristics of the inks in Comparative Examples.

DETAILED DESCRIPTION OF THE PREFERRED EMBODIMENTS

We will now explain the preferred embodiments of the present invention.

The present invention provides an ink containing a pigment and a resin component as a solid content, which further contains many components, such as a nonionic surfactant including polyethylene oxide groups and polypropylene oxide groups.

In the contained nonionic surfactant, the number x of the added polyethylene oxide groups and the number y of the added polypropylene oxide groups satisfy the relation that $0<y<x\leq10$, or satisfy the relation that $0<x\leq10$ and the relation that $x/2-1<y\leq x/3+2$. Specific examples of combinations (x, y) include: (3, 1 to 2), (5, 1 to 4), (7, 3 to 5), and (9, 3 to 5). Thus, the bubble generation is made to scarcely occur and the discharge becomes stable. The content of the nonionic surfactant is preferably not less than 0.001 wt % and not more than 2 wt %, this specified content range leading to a remarkable effect.

As the nonionic surfactant, the substance shown by the following formula (1) is used:

Formula 1 where q and r each represents the number of the methylene groups, and the relation that q+r=9 to 11 is satisfied; EO stands for the polyethylene oxide group and PO the polypropylene oxide group, and x and y represent the number of the added EO groups and the number of the added PO groups, respectively. Thus, the discharge property from the ink-jet head can be stabilized, and a high-quality printed image can be obtained.

At first, detailed description is made below on the ink for use in the ink-jet recording of the present invention. The pigments which can be used in the ink of the present invention generally include the following: as organic pigments, the azo based, phthalocyanine based, anthraquinone based, quinacridone based, dioxazine based, indigo based, thioindigo based, perylene based, isoindolenone based, aniline black, azomethine based, and rhodamine B lake pigments, carbon black and the like; and as inorganic pigments, iron oxide, titanium oxide, calcium carbonate, barium sulfate, aluminum hydroxide, barium yellow, Prussian blue, cadmium red, chrome yellow, and metal powders. However, a self-dispersion pigment which is charged and dispersed in water can be preferably cited. Specifically, there can be obtained a pigment dispersible in water by treating an organic pigment with the surface modification treatments such as the acid/base treatment, coupling agent treatment, polymer graft treatment, plasma treatment, oxidation/reduction treatment and the like.

The addition amount of the solid content containing a coloring material is preferably not less than 1 wt % and not more than 20 wt %, more preferably not more than 12 wt %, because with the addition amount exceeding this upper limit, the discharge stability cannot be ensured. With the addition amount less than 1 wt %, there will be no successful effect of addition.

In the case where a water-insoluble pigment is used, unless the sum content of the pigment and a fixable resin is 1% or more, the image quality is degraded. However, if the water-insoluble solid content is dispersed in the solvent that is the main component, the gas adsorbed on the solid surface is converted to bubbles, and thus causes bubble generation.

Such a water-insoluble coloring material as described above may be used in some cases as a coloring agent dispersion liquid that is dispersed by a dispersing agent.

The ink of the present invention can contain a water-soluble organic solvent. As a water-soluble organic solvent, an ethyleneglycol based ether can be contained in a content of 3% or more; for example, a triethyleneglycol based ether and/or a tetraethyleneglycol based ether can be cited. It is preferable that the content is 30 wt % or more.

As a water-soluble resin and an emulsion which can be used in the ink of the present invention, there can be cited the suspensions in water of the flowing substances: styrene-acrylate copolymer, polyacrylate, polymethacrylate, polystyrene, poly(ethyl acrylate), styrene-butadiene copolymer, butadiene copolymer, acrylonitrile-butadine copolymer, chloroprene copolymer, cross linked acrylate resin, cross linked styrene resin, fluorocarbon resin, vinylidene fluoride, benzoguanamine resin, polyolefin resin, styrene-methacrylate copolymer, polystyrene, styrene-acrylamide copolymer, n-isobutyl acrylate, acrylonitrile, vinyl acetate, acrylamide, polyvinylacetal, rosin based resin, polyethylene, vinylidene chloride resin, vinyl acetate resin, ethylene-vinyl acetate copolymer, vinyl acetate-acryl copolymer, vinyl chloride resin, polyester resin, and the like.

As for the ink of the present invention, for the purpose of providing the ink with the desired physical properties, preventing the ink from drying, and imparting to the ink the effects of the nozzle clogging resistance, moisture retaining property and dispersion stability, there may be mixed and used a plurality of the following hydrophilic high-melting point and low-volatile organic solvents. In other words, the following hydrophilic organic solvents may be used eather alone or in combination thereof: the polyalcohols including ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, petriol, and the like; the nitrogen-containing heterocyclic compounds including N-methyl-2-pyrrolidone, N-hydroxyethyl-2-pyrrolidone, 2-pyrrolidone, 1,3-dimethylimidazolidinone, ε-caprolactam, and the like; the amides including formamide, N-memthylformadie, N,N-dimethylformamide, and the like; the amines including monoethanolamine, diethanolamine, triethanolamine, monoethylamine, diethylamine, triethylamine, and the like; the sulfur-containing compounds including dimethylsulfoxide, sulfolane, thiodiethanol, ethylene urea, urea, and the like; and propylene carbonate, ethylene carbonate, γ-butyrolactone, and the like.

Additionally, the conventionally known additives for use in the recording liquids can be added to the image recording acceleration liquid and image recording liquid in the present invention. For example, as the antiseptic and antimold agents, there can be used sodium dehydroacetate, sodium sorbate, sodium 2-pyridinethiol-1-oxide, sodium benzoate, sodium pentachlorophenolate, and the like. As the pH adjuster, there can be used any substance as far as it does not give any adverse effect on the prepared ink and can adjust the pH to be 7 or higher. As such specific examples there can be cited the following substances: the amines including diethanolamine, triethanolamine, and the like; the hydroxides of the alkali metal elements including lithium hydroxide, sodium hydroxide, potassium hydroxide, and the like; the alkali metal carbonates and the like including ammonium hydroxide, quaternary ammonium hydroxide, quaternary phosphonium hydroxide, lithium carbonate, sodium carbonate, potassium carbonate, and the like. As the chelating reagents, there can be cited, for example, the following substances: sodium ethylenediamine tetraacetate, sodium nitrilotriacetate, sodium hydroxyethylethylenediamine triacetate, sodium diethylenetriamine petaacetate, sodium uramildiacetate, and the like. As the antirust agents, there can be cited, for example, the following substances: acid sulfite, sodium thiosulfate, ammonium thiodiglycollate, diisopropyrlammonium nitrite, pentaerythritol tetranitrate, dicyclohexylammonium nitrite, and the like. In addition to the above described substances, according to the purpose, the following substances can also be added: a water-soluble ultraviolet absorbing agent, a water-soluble infrared absorbing agent, a dissolution aid, an antioxidant, and the like.

It is preferable that the ink of the present invention has the static surface tension of 25 dyne/m to 50 dyne/m, and the viscosity of 1 cp to 10 cp.

Next, the present invention will be described in detail with reference to Examples and Comparative Examples, but the present invention is not limited to these Examples. First, the compositions of the inks used in the present invention are shown. Incidentally, the values given in % are represented in terms of the weights. Additionally, as for the compositions, the types and addition amounts of the pigments, resins, and solvents are as shown in FIGS. 1 and 2; ion-exchanged water was added so as to make the total quantity 100. Incidentally, the surfactant 1 is represented by the above formula (1) with x=9 and y=5; the surfactant 2, with x=1 and y=3; the surfactant 3, with x=15 and y=7; and the surfactant 4 is a polyethyleneoxide-polypropyleneoxide block polymer.

Each ink was prepared as follows: the individual components of the ink shown in FIG. 1 or 2 were mixed, and stirred and mixed together at 25° C. for one hour, and then the mixture was subjected to pressurized filtration with a membrane filter of 1.2 $\mu$m and to degassing treatment.

In the next place, the inks obtained according to the above description were subjected to the printing experiment on a piezoelectric ink-jet printer (brand name: CL-700 (manufactured by Epson Corp.)), and the continuous discharge stability and the fixability, water resistance, and image density of the printed objects were evaluated.

The evaluation of the "discharge stability" is described below. From the condition of the solid print on the 10% of an A4-sized sheet of paper, the ink discharge stability was evaluated. The evaluation standards, E, G, M, and P, are as follows:

E: The solid image can be obtained perfectly, and neither any white patch nor any faint portion is recognized.
G: The solid image is imperfect, and white stripes are generated.
M: Faint portions are generated, and no solid image can be obtained.
P: No ink is discharged, and no image is obtained.

The evaluation of the "fixability" is described below. A solid image is printed on a sheet of a commercially available paper for use in copying, the image was scraped with a sheet of filter paper with a load of 100 g after the elapsed time of 30 seconds from the printing, and the ink blotches on the filter sheet were examined. The evaluation standards, E, G, M, and P, are as follows:

E: No ink botches are found, and the fixing is satisfactory.
G: The filter sheet is somewhat blotched, but no adverse effect is found in the printed object.
M: The printed object is somewhat jumbled by scraping.
P: Both filter sheet and printed object are blotched.

The evaluation of the "water resistance" is described below. The solid image and the character image each printed on a sheet of an ordinary commercially available paper were soaked in water, and the conditions of the images were examined. The evaluation standards, E, G, M, and P, are as follows:

E: The ink does not bleed, and there is no trouble.
G: The ink somewhat exudes from the edges of the image.
M: The ink bleeding from the image somewhat gives color to the white portion.
P: Considerable amount of ink bleeds and the characters are blurred.

The evaluation of the "image density" is described below. The solid image was subjected to measurement on an X-Rite densitometer, and the evaluation was made on the basis of the obtained OD value. The evaluation standards, E, G and M are as follows:

E: The OD value is 1.0 or more.
G: The OD value is 0.8 to 1.0.
M: The OD value is 0.8 or less.

The overall evaluation standards are as follows:

E: Four E evaluations.
G: One or more E evaluations and no M or lower evaluation.
M: Three or more G evaluations or higher and no P evaluation.
P: The "water resistance" evaluation is M evaluation or lower, or the overall evaluation does not satisfy any of the above overall evaluations of E, G, and M.

The ink of Example 1 has the composition in conformity with the intention of the present invention. In order to show the effect of the present invention, Comparative Examples 1 to 8 are made to have the same solvent composition with Example 1, but the prescriptions for the surfactant are varied from that of Example 1.

In Comparative Example 1, a nonionic surfactant completely different in backbone was used, and according thereto absolutely no ink discharge was able to be performed in the ink discharge test so that no image was able to be obtained. Additionally, in Comparative Examples 2 and 3, there were used those surfactants which were the same in backbone but were outside the range of the number of the added groups limited in the present invention. Consequently, as compared to Comparative Example 1, the discharge property was improved, but no image deserving the evaluation was obtained. Furthermore, in Comparative Examples 4 and 5, evaluation was made with the addition amounts of the surfactant outside the addition amount range limited in the present invention; without a surfactant, no discharge was made, and with too much amount of surfactant, an undissolved remainder was generated, leading to an adverse effect on the discharge behavior.

In Comparative Examples 6 and 7, the amount of the solid content containing the coloring material was varied, and some problems were found in the discharge behavior.

Furthermore, in Comparative Example 8, the evaluation was made on the ink prepared with the same composition of the ink, but with a dye added as a coloring material. As compared to Example 1, no problem was found in the discharge property, but the water resistance can be seen to be considerably lower. Additionally, the image blurring was fairly serious, which indicates that the use of a pigment improves the image quality.

In Examples 2 to 7, the addition amount of the surfactant was varied, and the discharge property is slightly degraded as compared to Example 1. From this finding, it is desirable that the addition amount of the surfactant falls within the range described in Claim 2.

In Example 8, examination was made on the case where no resin component was added. The self-dispersion pigment underwent a treatment for grain size reduction to a fairly high degree, so that a pigment can be incorporated into the paper surface in the case of the ordinary papers, and accordingly a certain degree of fixability was able to be maintained without the addition of resin. However, the image density degradation was found, showing that the addition of the resin component is desirable.

Additionally, in Example 9, as a coloring material, a pigment, namely, the carbon black dispersed with a dispersing agent was used to make a comparison with the cases where the self-dispersion type pigment was used. Thus, it has been found that the self-dispersion type pigment is excellent both in the image density and in the discharge property, and also in the long-term preservation stability.

In the case of the composition of Example 10, the composition ratios of the solvents were small, so that the dissolution stability of the additives was degraded. Consequently, the discharge stability was degraded.

Furthermore, as is seen from a comparison between Example 1 with Example 11, the use of an ethyleneglycol based ether in the composition of the solvents improves the penetration of the ink along the plane direction, resulting in a high image density and contributing to the fast drying property.

As described above, according to the present invention, while maintaining the excellent performance of the pigment ink, the discharge performance is improved greatly in the piezoelectric ink-jet printer, so that a stable and satisfactory image can be obtained.

What is claimed is:

1. An ink for use in an ink-jet recording comprising a dye and/or a pigment and water as the indispensable components and a water-insoluble solid content of 1% or more of the whole quantity, wherein:

the ink further comprises a nonionic surfactant having polyethylene oxide groups and polypropylene oxide groups, which is a substance having the structure shown by the following structural formula 1; and a number x of the added polyethylene oxide groups and a number y of the added polypropylene oxide groups satisfy the relation that $$0 < x \leq 10,$$

and the relation that $$x/2 - 1 < y < x/3 + 2,$$

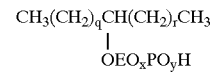

Formula 1 where q and r are respectively the numbers of the methylene groups, and satisfy the relation that $$9 \leq q + r \leq 11.$$

2. An ink for use in an ink-jet recording according to claim 1, wherein a content of said nonionic surfactant in the ink is no less than 0.001 wt % and no more than 2 wt %.

3. An ink for use in an ink-jet recording according to claim 1, wherein the solid content containing a coloring material is a pigment and a water-soluble resin and/or an emulsion and/or a latex.

4. An ink for use in an ink-jet recording according to claim 1, wherein said pigment is particularly a self-dispersion type pigment.

5. An ink for use in an ink-jet recording according to claim 1, wherein a content of a water-soluble organic solvent in the ink is 30 wt % or more.

6. An ink for use in an ink-jet recording according to claim 5, wherein said water-soluble organic solvent contains an ethyleneglycol based ether of 3 wt % or more.

7. An ink for use in an ink-jet recording according to claim 6, wherein said ethyleneglycol based ether is a triethyleneglycol based ether and/or a tetraethyleneglycol based ether.

8. An ink for use in an ink-jet recording according to claim 1, wherein a static surface tension of the ink is 25 dyne/m to 50 dyne/m.

9. An ink for use in an ink-jet recording according to claim 8, wherein a viscosity of the ink is 1 cp to 10 cp.

* * * * *